United States Patent
Crichton

[15] 3,666,908
[45] May 30, 1972

[54] METHOD FOR VERTICAL WELDING OF ALUMINUM

[72] Inventor: Alfred Buxton Crichton, Montrose, N.Y.
[73] Assignee: Union Carbide Corporation, New York, N.Y.
[22] Filed: Mar. 31, 1971
[21] Appl. No.: 129,757

Related U.S. Application Data

[63] Continuation-in-part of Ser. No. 039,425, May 21, 1970, Pat. No. 3,585,343.

[52] U.S. Cl. ..................................219/73, 219/126, 219/137
[51] Int. Cl. .............................................................B23k 9/18
[58] Field of Search.....................219/73, 74, 126, 137, 160; 13/9

[56] References Cited

UNITED STATES PATENTS

| | | |
|---|---|---|
| 3,229,068 | 1/1966 | Masegawa ...........................219/126 |
| 3,193,660 | 7/1965 | Colinet................................219/126 |
| 3,296,412 | 1/1967 | Waite et al...........................219/126 |
| 2,868,951 | 1/1959 | Shrubsall .............................219/74 |

Primary Examiner—J. V. Truhe
Assistant Examiner—George A. Montanye
Attorney—Paul A. Rose, Dominic J. Terminello and Eugene Lieberstein

[57] ABSTRACT

A method for vertical welding of aluminum wherein a cavity is formed between aluminum plates by placing graphite retaining members on the outside surface thereof. At least one non-consumable guide tube is placed in the cavity and a consumable wire is passed therethrough. A halogen base flux is fed into the cavity to shield the weld puddle and to provide a medium for resistance melting. Voltage is supplied to the wire from about 40 volts and 1,300 amps to about 75 volts and 400 amps. When multiple guide tubes and wires are used, the wire is skewed prior to entry into the non-consumable guide tube and rotated as it emerges therethrough to ensure complete fusion.

8 Claims, 2 Drawing Figures

INVENTOR
ALFRED B. CRICHTON
ATTORNEY

METHOD FOR VERTICAL WELDING OF ALUMINUM

This application is a continuation-in-part of U.S. Pat. Application Ser. No. 039,425, filed May 21, 1970, now U.S. Pat. No. 3,585,343.

This invention relates to the welding of pure aluminum and aluminum alloys and, more particularly, to the vertical welding of relatively thick aluminum members.

Up until now, there has not been developed a commercially practical process for the welding of heavy sections of aluminum, i.e., greater than 1 inch thick. A method of electroslag welding of aluminum has been disclosed in the literature, but this method has not been commercially accepted because of the complexity of the process.

It is the main object of this invention to provide a simple, economical process for welding heavy sections of aluminum and aluminum alloys.

Another object is to provide an electroslag process for welding aluminum and aluminum alloys which produces sound, porosity-free welds while requiring uncomplicated and easy to use equipment.

Figure 1:
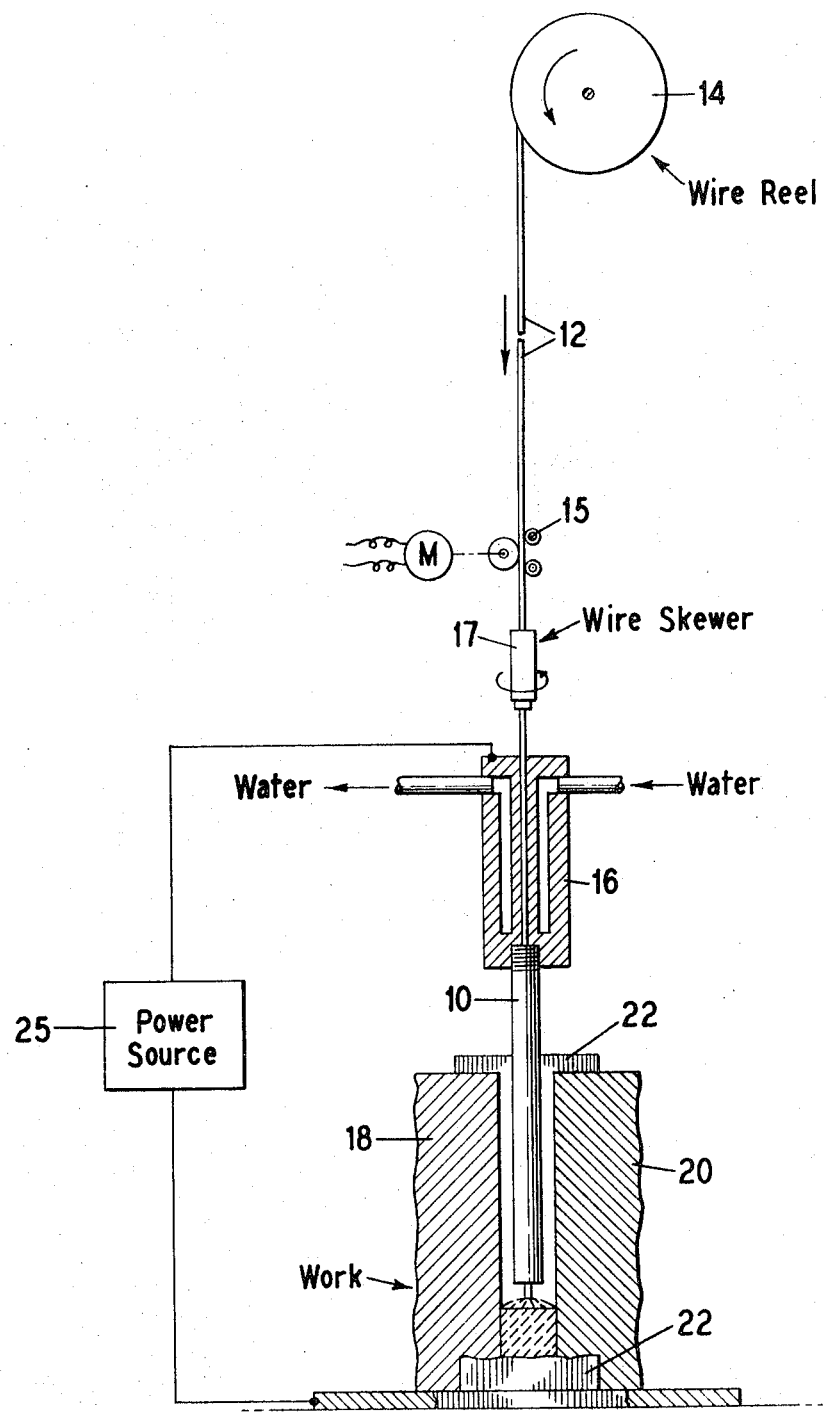
Figure 2:
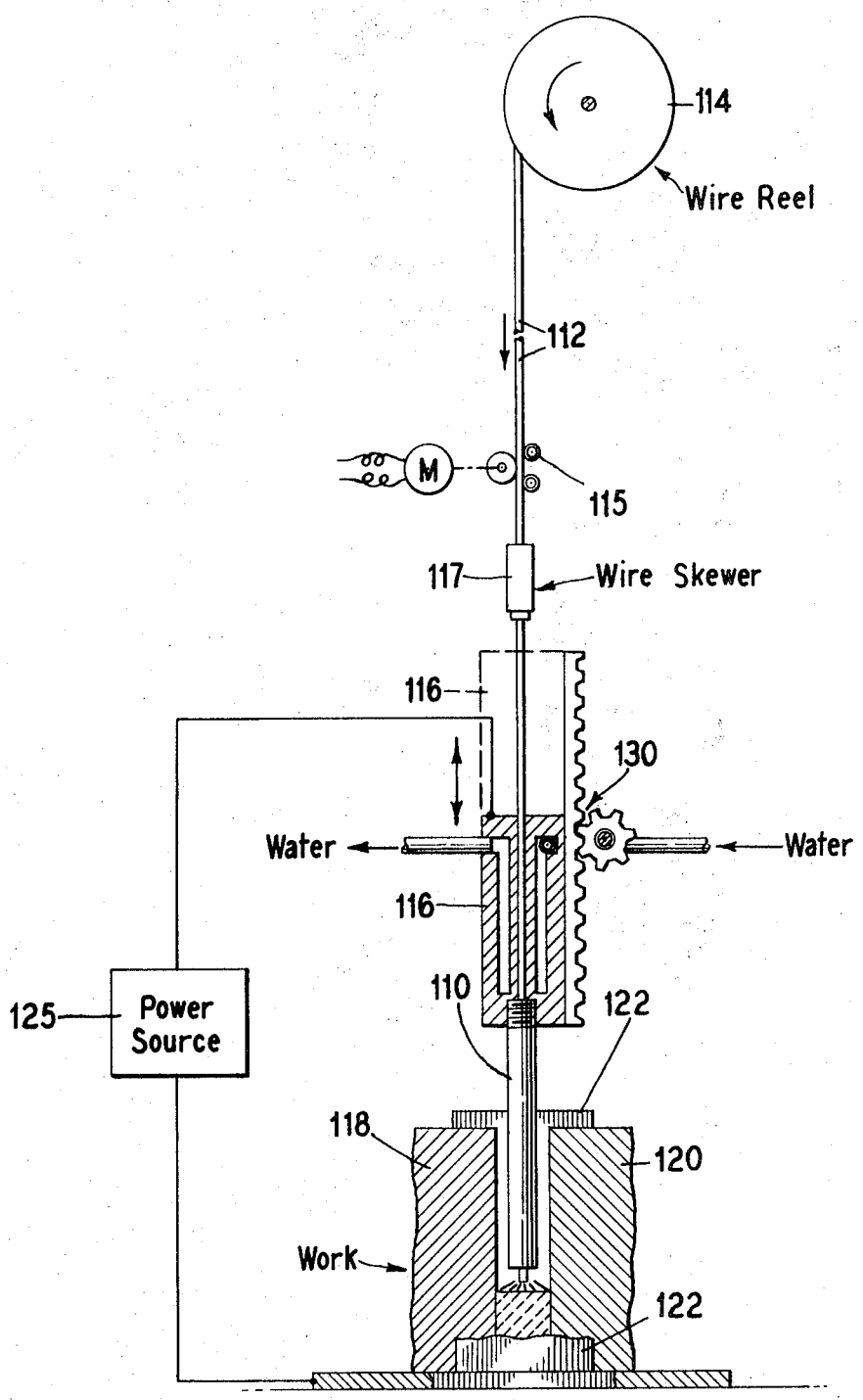

These and other objects will either be pointed out or become apparent from the following description and drawing wherein FIG. 1 is a front elevation, partially in cross-section showing a typical arrangement of equipment for carrying out the process of the invention;

FIG. 2 is similar to FIG. 1 showing a non-consumable moveable guide tube arrangement.

Referring to the FIG. 1, a stationary guide tube 10, made of aluminum through which passes an aluminum welding wire 12, supplied from a reel 14, is positioned between aluminum members 18 and 20. The wire is fed by feed roll 15, driven by motor M and passes through a wire skewer or bending device 17. This device rotates so as to put a bend in the wire 12, causing the end of the wire 12 to sweep in a circular path as it leaves the guide tube 10 and enters the weld zone. From the skewer 17, the wire passes through contact member 16 and then into the guide tube 10.

The guide tube 10 is placed between the spaced edges of the parts 18 and 20 of the aluminum to be welded. Graphite members 22, the criticality of which will be described hereinafter, are clamped to the outside surfaces of the weldment to form a cavity around the guide tube 10.

A suitable source 25 of welding power has one terminal connected to the contact member 16 and energizes the guide tube 10 which in turn energizes the wire 12. The other terminal of the source 25 is connected to a bottom plate 26 contacting the members 18 and 20.

In operation, the wire 12 is fed through the guide tube 10 until it emerges therefrom near the bottom of the plates to be welded. A halogen base flux is fed into the cavity and an arc is established. Sufficient flux is fed to provide a medium for resistance melting. The puddle is contained in the cavity and the guide tube and wire are progressively consumed as the weld puddle raises in a vertical direction.

The present invention is based on the discovery that because of the high heat conductivity of aluminum and the ease with which aluminum oxidizes, ordinary electroslag procedures could not be used to weld aluminum. Most unexpectedly, it was found that the material from which the retaining members or shoes 22 were manufactured, was critical. Copper or stainless steel members resulted in welds which had cold laps at the edges. Further, the flux used to shield the puddle from the atmosphere formed a mechanical bond between the retaining members and the weld so that the retaining members could not be removed from the completed weld. When the retaining members could be removed, the slag would stick to the weld.

A program was undertaken to solve this problem. It was discovered that retaining members made from graphite or retaining members lined with graphite on the surfaces facing the weld produced satisfactory results. With graphite retaining members, which term is used herein to include retaining members lined with graphite, most of the fused flux adheres to the retaining members so that the members can be removed when the weld is completed. An additional benefit of the graphite retaining members is that a relatively small amount of heat is conducted away from the weld puddle region through the members, thus reducing the amount of heat which must be introduced into the aluminum to make the weld.

It was found that in order to make vertical welds in aluminum, that not only must graphite retaining members be utilized, but also that the voltage and current supplied to each consumable wire must be maintained within a specified range. The voltage may be varied in the range of from 40 volts to 75 volts, while the current may correspondingly be varied from 1,300 amps to 400 amps. If power is used below these limits, cold lapping at the plate edges and lack of fusion results. If higher powers are used, stability of the process becomes poor.

It was also found that when welding aluminum plates having a thickness of greater than about two inches, a plurality of guide tubes must be used in conjunction with a skewed or bent wire. In order to accomplish this, a wire bender or skewer 17 is placed in the system and caused to rotate so that the wire 12 sweeps in a circular path around the weld zone as it leaves the guide tube 10. Without this skewing technique, it is difficult to get complete fusion of the weld. Because skewing the wire does ensure complete fusion, it is recommended for all thicknesses even though it is only critical when welding sections of greater than about 2 inches.

Another important element for the making of successful vertical aluminum welds is the flux. The flux must be a halogen base flux. A novel flux was developed for use in the present invention. The flux consists essentially of from about 35 to 60 weight per cent potassium chloride (KCl); from about 15 to 35 weight per cent sodium chloride (NaCl); from about 15 to 30 weight per cent cryolite ($NaAl_3F_6$); and from a trace up to about 10 weight per cent lithium fluoride (LiF). A preferred flux consists of 45 weight per cent KCl; 27 weight per cent NaCl; 22 weight per cent $NaAl_3F_6$; and 6 weight per cent LiF.

In order to make successful vertical welds in aluminum, it is preferred that the gap between the plates be between 1 3/16 inches and 1 5/8 inches. As in conventional electroslag processes, a reinforcement groove is preferably machined into the restraining members 22. This groove runs in the longitudinal direction and its function is to ensure a reinforcement of the weld at the plate edges. In welding aluminum, it is preferred that the groove have a larger cross-sectional area than grooves used for welding other materials. For example, conventional grooves have an area of about 0.17 sq. in. In welding aluminum, the groove should have an area of between 0.25 sq. in. and about 0.80 sq. in. The purpose of the large reinforcement groove is to decrease the vertical progression of the weld for a given current level. This enables a greater amount of power and heat to be transferred to the sections to be welded. The enlarged groove also provides a stirring action at the plate edges which ensures adequate fusion.

Referring now to FIG. 2, like parts bear like reference characters increased by 100. In this embodiment, a non-consumable guide tube 110 is placed in the cavity formed by the plates 118 and 120 and graphite members 122. In this embodiment, however, as the weld puddle raises in the vertical direction, the guide tube 110 which in this case is non-consumable, is raised by a rack and pinion arrangement 130. Of course, the relative motion between the guide tube 110 and the work could be achieved by other means. For example, the work could be moved relative to the guide tube, or a portable machine could be clamped to the workpiece and caused to crawl up on the plate while the weld is being made. Such machines are well known in the art and are commonly referred to as "Plate Crawlers."

Having described the invention with reference to certain necessary and certain preferred parameters, reference will now be made to examples of the invention which are provided to enable those skilled in the art to more fully understand how to practice this invention.

EXAMPLE I

In this example, two 2 inch thick 1100 aluminum plates were arranged as shown in the drawing with a 1 ⅜ inch gap between the plates. A five-eights inch 1100 aluminum guide tube was placed between the plate and graphite restraining members were clamped on the outside surface of the plates. Each shoe had a 0.60 sq. in. reinforcement groove therein. A one-eighth inch 1100 aluminum wire was fed to the guide tube. The flux consisted of:

45 wt.-% KCl; 6 wt.-% LiF; 27 wt.-% NaCl and 22 wt.-% NaAl$_3$F$_6$

The welding conditions were 600 amps at 56 volts. The wire feed rate was 710 ipm. A sound weld was produced.

EXAMPLE II

In this example, two 1 inch thick 1100 aluminum plates were arranged with a 1½ inch gap. A five-eighths inch 1100 aluminum guide tube was placed between the plates and graphite retaining members were used, each with a 0.80 sq. in. reinforcement groove therein. Flux; similar to Example I, was used. The wire feed rate was 600 ipm. Welding conditions were 550 amps at 56 volts. A sound weld was produced.

EXAMPLE III

Two 4 inch thick aluminum plates were arranged with 1½ inch gaps. Two five-eighths inch aluminum guide tubes and one-eighth inch aluminum wires were used. The guide tubes were spaced 2½ inches apart. The wires were bent by a skewer rotating at about 25 rpm or 1 rev. of wire for every one-eighth inch of vertical progression. The welding conditions on one guide tube were 600 amps at 61 volts with wire feed speed of 700 ipm. On the other wire the conditions were 58 volts at 600 amps, with wire feed equal of 710 ipm. Flux was the same as in Example I. Graphite restraining members were used, having a reinforcement of 0.60 sq. in.

EXAMPLE IV

Two 2 inch thick aluminum plates were arranged as shown in the drawing with a 1½ inch gap. A five-eighths inch aluminum guide tube and one-eighth inch aluminum wire was used. The wire was bent by the skewer which rotated. The graphite retaining members had a reinforcement area of 0.50 sq. in. The welding conditions at the bottom were 58 volts at 575 amps and 45 volts at 1,000 amps at the top. Flux was the same as Example I.

EXAMPLE V

Two 2 inch thick aluminum plates were arranged as shown in the drawings with a 1½ inch gap. A five-eighths inch aluminum guide tube and one-eighth inch aluminum wire was used. The wire was bent by the skewer which rotated at between 25 and 30 rpm. Graphite retaining members having a reinforcement area of 0.28 sq. in. were used. The welding conditions were 58 volts at 600 amps at the bottom and 40 volts at 1,300 amps at the top. The flux was the same as Example I. A sound weld was produced.

The term aluminum as used herein and in the claims is used to include pure aluminum and aluminum alloys.

The term graphite, as used herein and in the claims, is used to include other forms of carbon which will produce equivalent results.

What is claimed is:

1. A method for welding aluminum plates having a thickness of at least 1 inch which comprises:
    positioning said aluminum plates in spaced relation;
    positioning in the space between said plates at least one moveable non-consumable guide tube;
    placing graphite retaining members against the outside surfaces of said aluminum plates to form a cavity around said at least one non-consumable guide tube;
    passing a consumable aluminum wire through one end of the guide tube until it emerges at the other end thereof;
    striking an arc from the end of said consumable aluminum wire to form a weld puddle in said cavity;
    feeding a slag forming flux into said cavity to shield said weld puddle from the atmosphere and to provide a medium for resistance melting the plate, and wire; and
    progressively consuming said wire in said weld puddle as said weld puddle raises in a vertical direction, and moving said moveable non-consumable guide tube as said weld puddle raises in a vertical direction.

2. Method according to claim 1 wherein said flux consists essentially of halogen compounds.

3. Method according to claim 2 wherein said flux comprises of from about 35 to about 60 weight per cent KCl; about 15 to about 35 weight per cent NaCl; about 15 to about 30 weight per cent NaAl$_3$F$_6$; and from a trace up to about 10 weight per cent LiF.

4. Method according to claim 3 wherein said flux consists essentially of 45 weight per cent KCl; 27 weight per cent NaCl; 22 weight per cent NaAl$_3$F$_6$ and 6 weight per cent LiF.

5. Method according to claim 1 which includes skewing the consumable wire prior to its entry into the moveable non-consumable guide tube and rotating the end of said skewed consumable wire as it emerges from the other end thereof.

6. Method according to claim 1 wherein the space between the plates is from 1⅜ inches to about 1⅝ inches.

7. Method according to claim 1 wherein said graphite retaining members are provided with a reinforcement groove having an area of about 0.25 sq. in. to about 0.80 sq. in.

8. A method according to claim 1 wherein voltage is supplied to said consumable wire from about 40 volts and 1,300 amps to about 75 volts and 400 amps.

* * * * *